US006769985B1

(12) United States Patent
Laakso et al.

(10) Patent No.: US 6,769,985 B1
(45) Date of Patent: Aug. 3, 2004

(54) GAMING DEVICE AND METHOD FOR ENHANCING THE ISSUANCE OR TRANSFER OF AN AWARD

(75) Inventors: Jeffrey P. Laakso, Reno, NV (US); Joseph E. Kaminkow, Reno, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 09/583,482

(22) Filed: May 31, 2000

(51) Int. Cl.[7] .......................... A63F 13/00; A63F 3/24; G06F 17/00; G06F 19/00

(52) U.S. Cl. ............................ 463/25; 463/16; 463/20; 463/35; 273/138.1; 273/142 B

(58) Field of Search ............................... 463/25, 20, 1, 463/31, 16, 17, 35, 26, 27, 12, 28, 29, 40, 42, 46, 47, 13; 273/237, 274, 138.1, 139, 142 A, 142 B, 142 C, 142 D, 138.2, 148 R, 148 B, 454, 459, 460, 143 R; 700/90, 91, 82

(56) References Cited

U.S. PATENT DOCUMENTS 3,831,172 A 8/1974 Olliges et al.
4,300,225 A 11/1981 Lambl
4,314,236 A 2/1982 Mayer et al.
4,339,798 A * 7/1982 Hedges et al. .......... 364/412 X
4,344,345 A 8/1982 Sano
4,363,482 A 12/1982 Goldfarb
RE31,441 E * 11/1983 Nutting et al. .......... 273/121 A
4,496,149 A 1/1985 Schwartzberg
4,582,324 A 4/1986 Koza et al.
4,618,150 A * 10/1986 Kimura .............. 273/143 R X
4,624,459 A * 11/1986 Kaufman ............ 273/143 R X
4,660,107 A 4/1987 Chippendale, Jr.
4,695,053 A 9/1987 Vazquez, Jr. et al.
4,712,189 A 12/1987 Mohri
4,732,386 A 3/1988 Rayfiel
4,733,593 A 3/1988 Rothbart
4,791,558 A 12/1988 Chaitin et al.

(List continued on next page.)

FOREIGN PATENT DOCUMENTS

GB 2 201 279 A 8/1988
JP 11197292 A 12/1997
JP 411216221 A 8/1999
JP 02000296209 A 10/2000

OTHER PUBLICATIONS

Article, "A Salute to Game Shows–The Price Is Right–Pricing Games–Three Strikes," p. 8 of 9, online, retrieved on Aug. 16, 2000. Retrieved from the Internet: <http://ben–s-chumin.simplenet.com/game–shows/shows/price–is–right/pricing–games–4.htm>.

(List continued on next page.)

*Primary Examiner*—Teresa Walberg
*Assistant Examiner*—Binh-An D. Nguyen
(74) *Attorney, Agent, or Firm*—Bell, Boyd & Lloyd, LLC

(57) ABSTRACT

The present invention provides a gaming device and method for enhancing an award or a transfer of a plurality of credits. The gaming device and method initially displays one or more audio and visual signals as the device begins to transfer gaming device credits. At certain points, preferably in accordance with the gaming device theme, the device selectively adds one or more visual and audio signals to the original display, as the device transfers more and more credits. The method of adding consecutive layers of sound and visual displays creates denser, richer and more complex displays that associates with larger amounts of accumulated credits. The method contemplates basing the set points on a predetermined amount of time, or a percentage of total credits transferred or on a number of credits transferred. Preferably, when the final credit is issued, the gaming device and method provides a final sound and visual display, which terminates the previously built up layers and brings the credit accumulation to its conclusion.

78 Claims, 6 Drawing Sheets

U.S. PATENT DOCUMENTS 4,876,937 A 10/1989 Suzuki
4,961,575 A 10/1990 Perry
4,974,483 A 12/1990 Luzzatto
4,974,857 A 12/1990 Beall et al.
5,096,195 A 3/1992 Gimmon
5,119,465 A 6/1992 Jack et al.
5,179,517 A * 1/1993 Sarbin et al. ........... 364/410 X
5,221,801 A 6/1993 Bruti et al.
5,223,828 A 6/1993 McKiel, Jr.
5,242,163 A * 9/1993 Fulton ................ 273/85 CP X
5,258,574 A 11/1993 Kawano
5,266,736 A 11/1993 Saito
5,275,400 A * 1/1994 Weingardt et al. .. 273/85 CP X
5,287,102 A 2/1994 McKiel, Jr.
5,331,112 A 7/1994 Sato et al.
5,342,047 A 8/1994 Heidel et al.
5,371,345 A * 12/1994 LeStrange et al. ...... 235/380 X
5,390,938 A 2/1995 Takeya
5,393,061 A 2/1995 Manship et al.
5,393,070 A 2/1995 Best
5,429,507 A 7/1995 Kaplan
5,430,835 A 7/1995 Williams et al.
5,446,902 A 8/1995 Islam
5,449,173 A 9/1995 Thomas et al.
5,469,511 A 11/1995 Lewis et al.
5,470,233 A 11/1995 Fruchterman et al.
5,472,197 A 12/1995 Gwiasda et al.
5,508,699 A 4/1996 Silverman
5,515,764 A 5/1996 Rosen
5,577,253 A 11/1996 Blickstein
5,606,144 A 2/1997 Dabby
5,625,845 A 4/1997 Allran et al.
5,668,996 A 9/1997 Radinsky
5,695,188 A * 12/1997 Ishibashi ................ 273/143 R
5,697,843 A 12/1997 Manship et al.
5,703,310 A 12/1997 Kurakake et al.
5,707,286 A 1/1998 Carlson
5,715,459 A 2/1998 Celi
5,745,761 A 4/1998 Celi
5,745,762 A 4/1998 Celi
5,758,875 A 6/1998 Giacalone, Jr.
5,762,552 A 6/1998 Vuong et al.
5,766,074 A 6/1998 Cannon et al.
5,772,509 A 6/1998 Weiss
5,778,231 A 7/1998 Van Hoff
5,792,972 A 8/1998 Houston
5,802,364 A 9/1998 Senator
5,807,172 A 9/1998 Piechowiak
5,809,303 A 9/1998 Senator
5,833,538 A 11/1998 Weiss
5,839,958 A 11/1998 Ozarow
5,848,932 A 12/1998 Adams
5,854,927 A 12/1998 Gelissen
5,876,284 A * 3/1999 Acres et al. .................. 463/25
5,880,386 A 3/1999 Wachi et al.
5,889,990 A 3/1999 Coleman
5,892,171 A 4/1999 Ide
5,902,184 A 5/1999 Bennett et al.
5,908,354 A 6/1999 Okuniewicz
5,910,048 A 6/1999 Feinberg
5,911,071 A 6/1999 Jordan
5,920,720 A 7/1999 Toutonghi et al.
5,923,878 A 7/1999 Marsland
5,923,880 A 7/1999 Rose
5,930,509 A 7/1999 Yates
5,937,193 A 8/1999 Evoy
5,946,487 A 8/1999 Dangelo
5,946,489 A 8/1999 Yellin
5,964,843 A 10/1999 Berry et al.
5,966,535 A 10/1999 Benedikt
5,967,894 A 10/1999 Kinoshita et al.
5,970,249 A 10/1999 Holzle
5,978,585 A 11/1999 Crelier
5,997,401 A 12/1999 Crawford
5,999,731 A 12/1999 Yellin
6,003,038 A 12/1999 Chen
6,015,346 A 1/2000 Bennett
D421,277 S 2/2000 McGahn et al.
6,021,272 A 2/2000 Cahill
6,021,273 A 2/2000 Criesemer
6,026,238 A 2/2000 Bond
6,029,000 A 2/2000 Woolsey
6,031,993 A 2/2000 Andrews
6,035,120 A 3/2000 Ravichandran
6,056,642 A 5/2000 Bennett
6,062,979 A 5/2000 Inoue
6,066,181 A 5/2000 DeMaster
6,071,192 A * 6/2000 Weiss ..................... 273/143 R
6,074,432 A 6/2000 Guccione
6,075,940 A 6/2000 Gosling
6,084,169 A 7/2000 Hasegawa et al.
6,089,976 A 7/2000 Schneider et al.
6,089,978 A 7/2000 Adams
6,092,147 A 7/2000 Levy
6,096,095 A 8/2000 Halstead
6,102,400 A 8/2000 Scott et al.
6,106,393 A * 8/2000 Sunaga et al. ................ 463/20
6,110,041 A 8/2000 Walker et al.
6,110,043 A * 8/2000 Olsen .......................... 463/27
6,110,226 A 8/2000 Bothner
6,113,495 A 9/2000 Walker et al.
6,117,009 A 9/2000 Yoseliff
6,126,165 A * 10/2000 Sakamoto ............... 273/143 R
6,131,191 A 10/2000 Cierniak
6,138,273 A 10/2000 Sturges
6,141,794 A 10/2000 Dice
6,142,875 A 11/2000 Kodachi et al.
6,146,273 A * 11/2000 Olsen .......................... 463/27
6,146,276 A 11/2000 Okuniewicz
6,155,925 A 12/2000 Giobbi et al.
6,159,097 A 12/2000 Gura
6,174,233 B1 1/2001 Sunaga et al.
6,174,235 B1 1/2001 Walker et al.
6,175,632 B1 1/2001 Marx
6,198,395 B1 3/2001 Sussman
6,217,448 B1 * 4/2001 Olsen .......................... 463/25
6,238,288 B1 5/2001 Walker et al.
6,241,612 B1 6/2001 Heredia
6,254,481 B1 7/2001 Jaffe
6,270,411 B1 8/2001 Gura et al.
6,293,869 B1 9/2001 Kwan et al.
6,302,790 B1 10/2001 Brossard
6,306,034 B1 10/2001 Sakamoto et al.
6,309,299 B1 10/2001 Weiss
6,309,301 B1 10/2001 Sano
6,311,982 B1 11/2001 Lebensfeld et al.
6,328,648 B1 12/2001 Walker et al.
6,390,923 B1 5/2002 Yoshitomi et al.
6,409,596 B1 6/2002 Hayashida et al.
6,416,411 B1 * 7/2002 Tsukahara .................... 463/35
6,516,466 B1 2/2003 Jackson
6,537,152 B2 3/2003 Seelig et al.
6,544,122 B2 4/2003 Araki et al.
6,554,703 B1 4/2003 Bussick et al.
6,561,908 B1 5/2003 Hoke
6,599,195 B1 7/2003 Araki et al.
6,638,169 B2 10/2003 Wilder et al.
2002/0077165 A1 6/2002 Bansemer et al.
2003/0064798 A1 4/2003 Grauzer et al.
2003/0064808 A1 4/2003 Hecht et al.
2003/0073489 A1 4/2003 Hecht et al.

| | | | |
|---|---|---|---|
| 2003/0073490 | A1 | 4/2003 | Hecht et al. |
| 2003/0073491 | A1 | 4/2003 | Hecht et al. |

OTHER PUBLICATIONS

Article, "Frankie & Annette's Beach Party Bally Gaming," published by Strictly Slots, Dec., 2001.
Article, "Megaman X's Soundcard History Museum," pp. 1–5, retrieved on May 11, 2000 on Internet at http://digitalparadise.cgocable.ca/MegMan__X/Soundcards.
Article, "Microprocessor Report," pp. 2, 12–17, published by Micro Design Resources on Mar. 25, 1996.
Article, "Monolopy Movers & Shakers Williams/WMS Gaming," published by Strictly Slots publication in Jul., 2000.
Brochure of Bally Gaming, Inc., "EVO HYBRID Frankie & Annette's Beach Party," published by Bally Gaming Inc. in the year 2001 on or before Dec. thereof.
Brochure of Bally Gaming, Inc., "Frankie & Annette's Beach Party (EVO Hybrid)," http://www.ballygaming.com/gameroom/games.asp?gameID=664, Jan. 9, 2004.
Brochure of IGT, "Elephant King," http://www.igt.com/games/new__games/elephant.html, Mar. 21, 2001.
Brochure of IGT, "Leopard Spots, Double Diamond 2000, Little Green Men, Elephant King, I Dream of Jeannie," available in Oct., 1999.
Brochure of IGT, "Run for Your Money S–Plus Limited," published in the year 1998 on or before Dec. thereof.
Brochure of IGT, "Top Dollar S–Plus Limited," published in the year 1998 on or before Dec. thereof.
Brochure of IGT, "Wheel of Fortune," published in the year 1998 on or before Dec. thereof.
Brochure of WMS Gaming Inc., "Meet the Next Generation of Monopoly Slot Machines from WMS Gaming!" published by Hasbro, Inc. in the year 1999 on or before Dec. thereof.
Brochure of WMS Gaming Inc., "Monopoly Chairman of the Board," published by Hasbro, Inc. in the year 1999 on or before Dec. thereof.
Brochure of WMS Gaming Inc., "Monopoly Once Around," published by Hasbro, Inc. in the year 1998 on or before Dec. thereof.
Brochure of WMS Gaming Inc., "Monopoly Reel Estate," published by Hasbro, Inc. in the year 1998 on or before Dec. thereof.
Brochure of WMS Gaming Inc., "Movers & Shakers," published by Hasbro, Inc. in the year 2000 on or before Dec. thereof.
Chutes and Ladders CD–ROM Game, Hasbro Interactive, Inc., available in the year 1999 on or before Dec. thereof.
Description of Accelerated Credit Roll–Up in Gaming Machines written by IGT, available in the year 1999 on or before Dec. thereof.
Description of Action Prompts in Gaming Machines, written by IGT, available in the year 1999 on or before Dec. thereof.
Description of Last Sound in Credit Roll–Up in Gaming Machines written by IGT, available in the year 2000 on or before Dec. thereof.
Description of Lighting Features in Gaming Machines, written by IGT, available in the year 1999 on or before Dec. thereof.
Description of Maximum Wager Sound and Bet Sounds in Gaming Devices written by IGT, available in the year 2000 on or before Dec. thereof.
Description of Sound Effects in Gaming Devices written by IGT, available in the year 2000 on or before Dec. thereof.
Description of Sound Feature in Totem Pole™ Gaming Machine written by IGT, available in the year 1997 on or before Dec. thereof.
Description of Tempo Change In Gaming Machines written by IGT, available in the year 2000 on or before Dec. thereof.
Description of Verbal Wager Feature in "Dick Clark" Gaming Machine written by IGT, available in the year 2000 on or before Dec. thereof.
Description of Volume Control Functions in Gaming Machines written by IGT, available in the year 1999 on or before Dec. thereof.
MIDI Media Adaptation Layer for IEEE–1394, published by the Association of Musical Electronics Industry in Tokyo, Japan and The MIDI Manufacturers association in Los Angeles, California, Nov. 30, 2000, pp. 1–17.
Press Release by Ian Fries of CNET News.com, "Microsoft Releases XP for Slot Machines," file://C:WINDOW...\Microsoft releases XP for slot machines—Tech News—CNET.com.htm., Nov. 28, 2001, pp. 1–2.
Press Release, "WMS Gaming's Monopoly Slot Machines Named 1998's Most Innovative Gaming Product At The American Gaming, Lodging and Leisure Summit," published by WMS Gaming Inc. on Jan. 13, 1999.
Screen Shot and Description by IGT of "Free Spins Bonus (Elephant King)" written by IGT, available in Oct., 1999.
Screen Shots of "Race Car Bonus Feature" written by IGT, available in the year 1998 on or before Dec. thereof.
The Java™ Tutorial, "What Can Java Technology Do?" http://java.sun.com/docs/books/tutorial/getStarted/i.../definition.htm, Oct. 16, 2000, pp. 1–2.
The MIDI File Format, http://crystal.capana.org.au/ghansper/midi__introduction/midi__file__format.html, Dec. 28, 2001, pp. 1–10.
Description of Payout Sound Feature in Gaming Machine by IGT.
Description of Progressive Sound Feature in Pinball and Video Games.
Totem Pole Brochures (and Description of Sopund Feature in Totem Pole Gaming Machine).

* cited by examiner

GAMING DEVICE AND METHOD FOR ENHANCING THE ISSUANCE OR TRANSFER OF AN AWARD

CROSS-REFERENCE TO RELATED APPLICATIONS

This application is related to the following commonly-owned co-pending patent applications: "GAMING DEVICE HAVING CHANGED OR GENERATED PLAYER STIMULI," Ser. No. 09/686,244, "GAMING DEVICE HAVING PAYTONES IN SYNC WITH ACCOMPANYING MUSIC," Ser. No. 60/239,722, and "GAMING DEVICE WITH A METRONOME SYSTEM FOR INTERFACING SOUND RECORDINGS," Ser. No. 09/687,692.

The present invention relates in general to a gaming device and method, and more particularly to a gaming device and method for enhancing the issuance or transfer of an award to increase player excitement and enjoyment.

BACKGROUND OF THE INVENTION

Gaming machines currently emit or provide sounds as the gaming machines pay out or issue a number of coins or tokens to a player. Typically, the machines emit or provide a familiar bell sound or ding to a player. The machines time the sound emission to correspond to the time when a coin or token contacts the bottom of a payout tray. When multiple coins or tokens contact the tray in a sequence, the machines emit or provide the payout sounds to correspond to the sequence. In effect, current gaming machines simulate an amplified version of the sound that the actual coins or tokens make when they contact or strike the surface of the payout tray. When the machine issues one coin or token, the existing machines make one sound. When the machine issues many coins or tokens, the existing machines make a plurality of the same sounds.

The purpose of emitting or providing these sounds, which correspond to the frequency of the payout, is to increase player enjoyment and excitement by enhancing the payout to the player and by magnifying and intensifying the payout. Additionally, other players hear the payout sounds, which increases their excitement, enjoyment and expectation of success. These sounds also create an overall excitement in the gaming area.

Gaming machines have historically employed a single bell or ding sound as described above. The implementor of the device can program the gaming device to vary the single sound either by making it louder or making it occur more frequently. However, there exists a level above which the amplitude or loudness of the sound will begin to disturb or hurt the eardrums of a player and surrounding players. There also exists a frequency level above which a player will not be able to discern one sound from another. In such case, the player will perceive one continuous sound. Thus, the known methods limit the ability of gaming devices to enhance excitement during payouts or credit transfers, such as a transfer from a bonus round to the base game as described below. A need exists for a method to enhance the excitement of relatively larger payouts, wherein many coins are paid out over an extended time period. A need also exists to develop a method that recognizes higher frequencies of payout issuance, wherein many coins are paid out at once.

It is also desirable to enhance a player's enjoyment whenever the game awards credits to a player. Normally, when the player succeeds at the normal or base game of the gaming device, the game awards electronic credits and updates the player's credit display. Further, to enhance player enjoyment and excitement, gaming manufacturers have provided players with machines having bonus schemes. The bonus schemes give players multiple opportunities to receive relatively large payouts over and above the player's success in the base game.

The bonus scheme provides a game within the game, and consequently, a separate and distinct payout from that of the base game. Typically, the payout of a bonus scheme is either an addition of game credits to the player's total game credits or a multiplication of the amount of base game credits that the player has bet before entering the bonus round. In both the base and bonus games, the payout often does not involve actual coins or tokens that contact the bottom of a payout tray.

While the gaming device can employ the typical ding or bell sound when the game electronically transfers credits to or updates the player's base game credit total from the bonus round, the significance of emulating or magnifying the actual sound of a coin or token contacting the payout tray is lost. It is therefore desirable to create another method of audibly recognizing, celebrating and enhancing the player's success in a bonus round that preferably corresponds to the bonus scheme. The method should also correspond to the overall theme of the gaming device so that the base game can employ the method whenever the player's award is an electronic addition or transfer of credits rather than an actual payout.

Newer gaming machines typically contain a video display or touch screen that enables the newer machines to display images that older machines could not display. Gaming machines containing a video display or touch screen have the capability to visually enhance a payout or transfer. It is therefore further desirable to create a device and method for enhancing payouts or transfers that incorporate both visual and audio displays in accordance with the base game and bonus scheme themes.

SUMMARY OF THE INVENTION

The present invention provides a gaming device and method of enhancing a gaming device award, which overcomes the limitations of known enhancement methods. When a player playing a gaming device receives an award, the present invention preferably employs both a visual and an audio display to enhance the award. However, it should be appreciated that the present invention contemplates using the audio display and the visual display separately during a payout or transfer. Further, the present invention could provide only a visual or only an audio display. When in combination, the visual and audio displays preferably relate to each other to form an overall theme. For example, the game could display a musician singing a song. The overall theme of the audio and visual displays preferably relates to a theme of the payout mechanism; i.e., a winning set of reels, a bonus scheme, or a cash-out. The present invention contemplates selectively adding one or more overlapping audio and visual displays at certain set points during the transfer.

The method employs a video monitor, a plurality of speakers, a controller having a sound card, one or more timers or a counter, and at least one of the payout mechanisms described above. The payout mechanisms trigger a transfer of credits. For purposes of this application, a transfer includes an issuance of an award from a winning spin of a set of reels, a cash-out where base game credits are transferred to coins or tokes, and a bonus scheme payout where bonus awards are transferred to base game credits. The video monitor displays a plurality of visual displays which comprise one or more static or animated video signals. The speakers emit or provide a plurality of audio displays or sounds that comprise one or more audio signals.

The method accommodates the theme and nuances of any payout mechanism by selectively adding one or more audio or visual signals at certain set-points. The set points of the present method are either points in time during the transfer, percentages of total payment during the transfer, or numbers of credits transferred. In one embodiment, a timer begins to run as soon as an award is triggered. The set points of the timer direct the processor of the gaming device to add one or more displays, or one or more components or signals of a display. Alternatively, a counter begins to count as soon as the gaming device begins to issue or transfer credits. During the payout, the processor uses the count to determine the percentage of the total award that has been paid. The gaming machine's memory device stores percentage set points. The percentage set points of the memory also direct the processor of the gaming device to add or subtract displays or signals during the payout or credit transfer. The timer and the counter provide two separate embodiments of the invention.

In the preferred embodiment of the invention, the audio and visual displays accumulate so that after any given set-point, the monitor displays and the speakers emit more signals than before the set point. After a predetermined time period or after a predetermined percentage of the payout has occurred (i.e., a set point is reached), the gaming device increases or adds additional sounds to the audio production and additional video to the visual display (audio production and video display a hereafter referred to collectively as "the displays"). The displays become richer and fuller as the player's credit display increases or coins in the coin tray increase.

In an alternative embodiment of the invention, the displays can add, discontinue, or reactivate any video or audio signal in accordance with the award method theme or any of the payout mechanism themes. The richness or fullness of the displays can fluctuate from set point to set point. This alternative embodiment addresses the need to more appropriately enhance a high frequency issuance or transfer of credits.

It is therefore an object of the present invention to provide a gaming device and method for enhancing the issuance or transfer an award.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1:
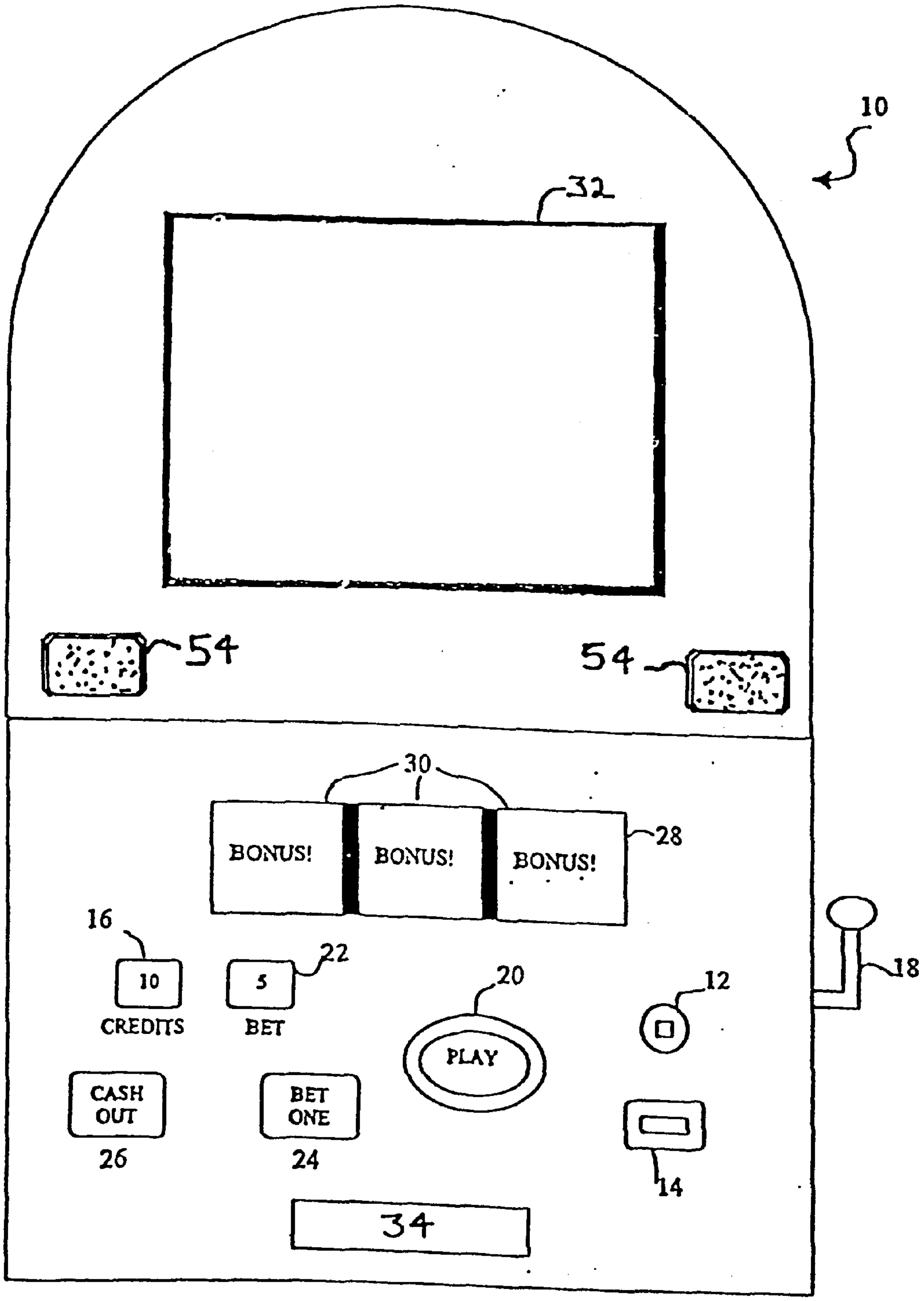
FIG. 1 is a front plan view of one embodiment of the gaming device of present invention.

Referring now to the drawings, FIG. 1 generally illustrates a gaming device 10 of one embodiment of the present invention, which is preferably a slot machine having the controls, displays and features of a conventional slot machine. Gaming device 10 is constructed so that a player can operate gaming device 10 while standing or sitting. However, it should be appreciated that gaming device 10 can be constructed as a pub-style table-top game (not shown) which a player can operate preferably while sitting. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any game such as slot, poker or keno in addition to any of their bonus triggering events which trigger the bonus scheme of the present invention. The symbols and indicia used on and in gaming device 10 may be in mechanical, electrical or video form.

As illustrated in FIG. 1, gaming device 10 includes a coin slot 12 and bill acceptor 14 where the player inserts money, coins or tokens. The player can place coins in the coin slot 12 or paper money in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18, pushing play button 20 or activating any other mechanism which starts the game.

As shown in FIG. 1, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

Gaming device 10 also has a display window 28 which contains a plurality of reels 30, preferably three to five reels in mechanical or video form. Each reel 30 displays a plurality of indicia such as bells, hearts, fruits, numbers, letters, bars or other images which preferably correspond to a theme associated with the gaming device 10. If the reels 30 are in video form, the gaming device 10 preferably displays the video reels 30 at video monitor 32 instead of at display window 28.

At any time during the game, a player may cash out and thereby receive a number of coins corresponding to the number of remaining credits by pushing a cash out button 26. When the player cashes out, the player receives the coins in a coin payout tray 34. The gaming device 10 may employ other payout mechanisms such as credit slips redeemable by a cashier or electronically recordable cards which keep track of the player's credits. Gaming device 10 also preferably includes speakers 54 for making sounds or playing music.

Figure 2:
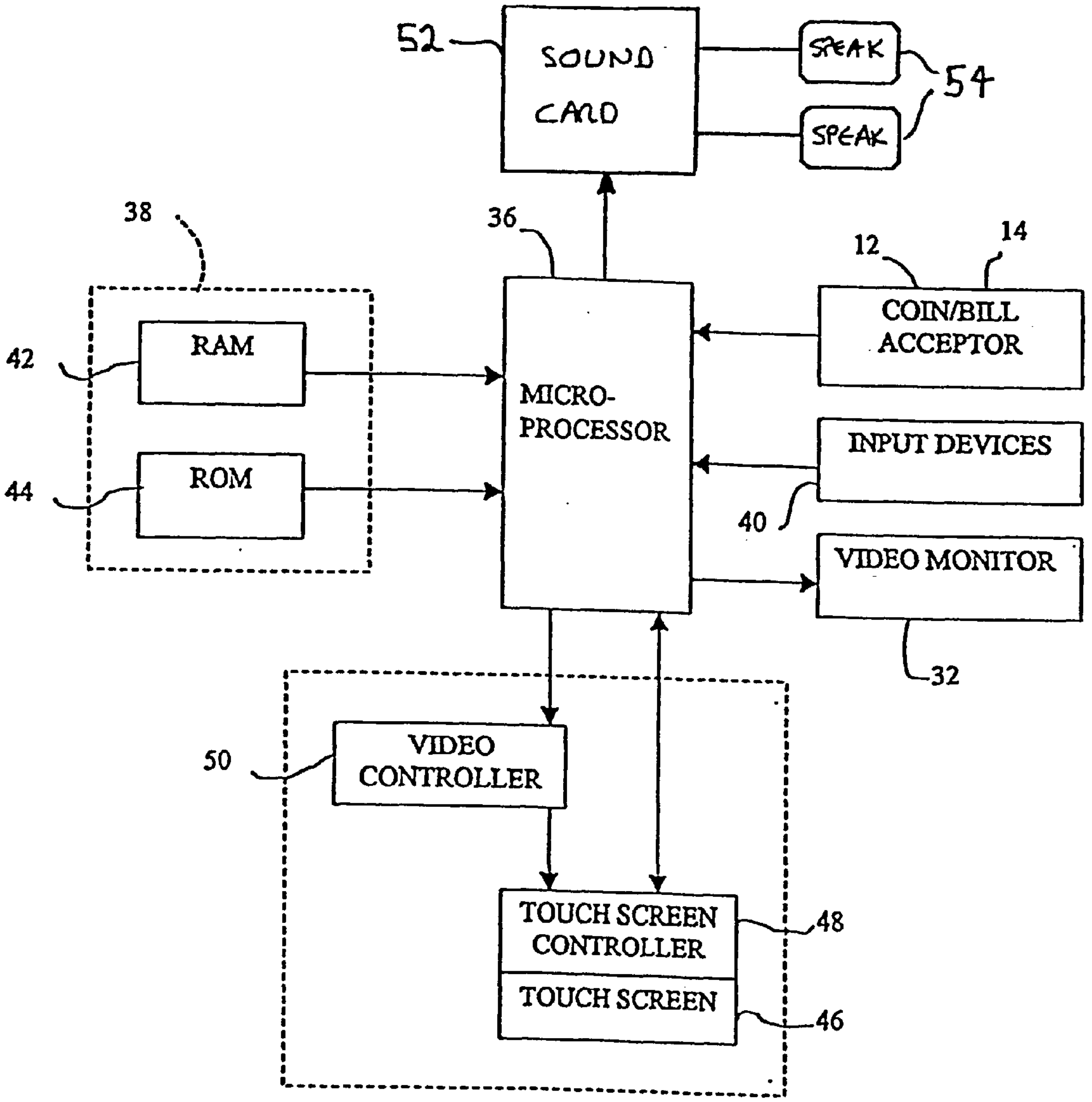
FIG. 2 is a schematic block diagram of the electronic configuration of the gaming device of the present invention.

With respect to electronics, gaming device 10 preferably includes the electronic configuration generally illustrated in FIG. 2, including a processor 36, a memory device 38 for storing program code or other data, a video monitor 32 or other display device (i.e., a liquid crystal display) and at least one input device as indicated by block 40 such as the arm 18, play button 20, the bet one button 24, and the cash out button 26. The processor 36 is preferably a microprocessor or microcontroller-based platform which is capable of displaying images, symbols and other indicia such as images of people, characters, places, things and faces of cards. The memory device 38 can include random access memory (RAM) 42 for storing event data or other data generated or used during a particular game. The memory device 38 can also include read only memory (ROM) 44 for storing program code which controls the gaming device 10 so that it plays a particular game in accordance with applicable game rules and pay tables.

As illustrated in FIG. 2, the player can use input devices as generally indicated by block 40 to input signals into gaming device 10. However, it is preferable that a touch screen 46 and an associated touch screen controller 48 are used instead of the conventional video monitor 32. Touch screen 46 and touch screen controller 48 are connected to a video controller 50 and processor 36. A player can make decisions and input signals into the gaming device 10 by touching touch screen 46 at the appropriate places. As further illustrated in FIG. 2, the processor 36 can be connected to coin slot 12 or bill acceptor 14. The processor 36 can be programmed to require a player to deposit a certain amount of money in order to start the game.

The processor 36 also connects to a sound card 52, which can be programmed to store sounds used by the gaming device 10. The sound card 52 can store any type of sound whether it be harmonic such as music or non-harmonic such as the sound of a buzzer, including the magnitude or volume of the sound and the time or times at which the sound is emitted or provided. The sound card can also store any number of different sounds or provide a plurality of audio signals either sequentially or at the same time. The sound card connects to at least one and preferably a pair of speakers 54. Preferably, the speakers are positioned in gaming device 10 to maximize the efficiency with which the speakers provide sounds audible to the player. The processor 36, during the operation of the gaming device 10, directs the sound card 54 to send one or more audio signals to the speakers 54, which provide audible sounds created from the signals.

It should be appreciated that although a processor 36 and memory device 38 are preferable implementations of the present invention, the present invention can also be implemented using one or more application-specific integrated circuits (ASIC's) or other hard-wired devices, or using mechanical devices (collectively referred to herein as a "processor"). Furthermore, although the processor 36 and memory device 38 preferably reside on each gaming device 10 unit, it is possible to provide some or all of their functions at a central location such as a network server for communication to a playing station such as over a local area network (LAN), wide area network (WAN), Internet connection, microwave link, and the like. The processor 36 and memory device 38 are together generally referred to herein as a "computer."

With reference to FIGS. 1 and 2, to operate the gaming device 10, the player must insert the appropriate amount of money or tokens at coin slot 12 or bill acceptor 14 and then pull the arm 18 or push the play button 20. The reels 30 will then begin to spin. Eventually, the reels 30 will come to a stop. As long as the player has credits remaining, the player can spin the reels 30 again. Depending upon where the reels 30 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on the display window 28. The gaming device 10 also includes a display device such as a video monitor 32 shown in FIG. 1. The display device visually displays images and produces sounds, enabling the player to play the bonus round. Preferably, the qualifying condition is a predetermined combination of indicia appearing on a plurality of reels 30. As illustrated in the three reel slot machine shown in FIG. 1, the qualifying condition could be the text "BONUS!" appearing in the same location on three adjacent reels.

Enhancement Method

Figure 3:
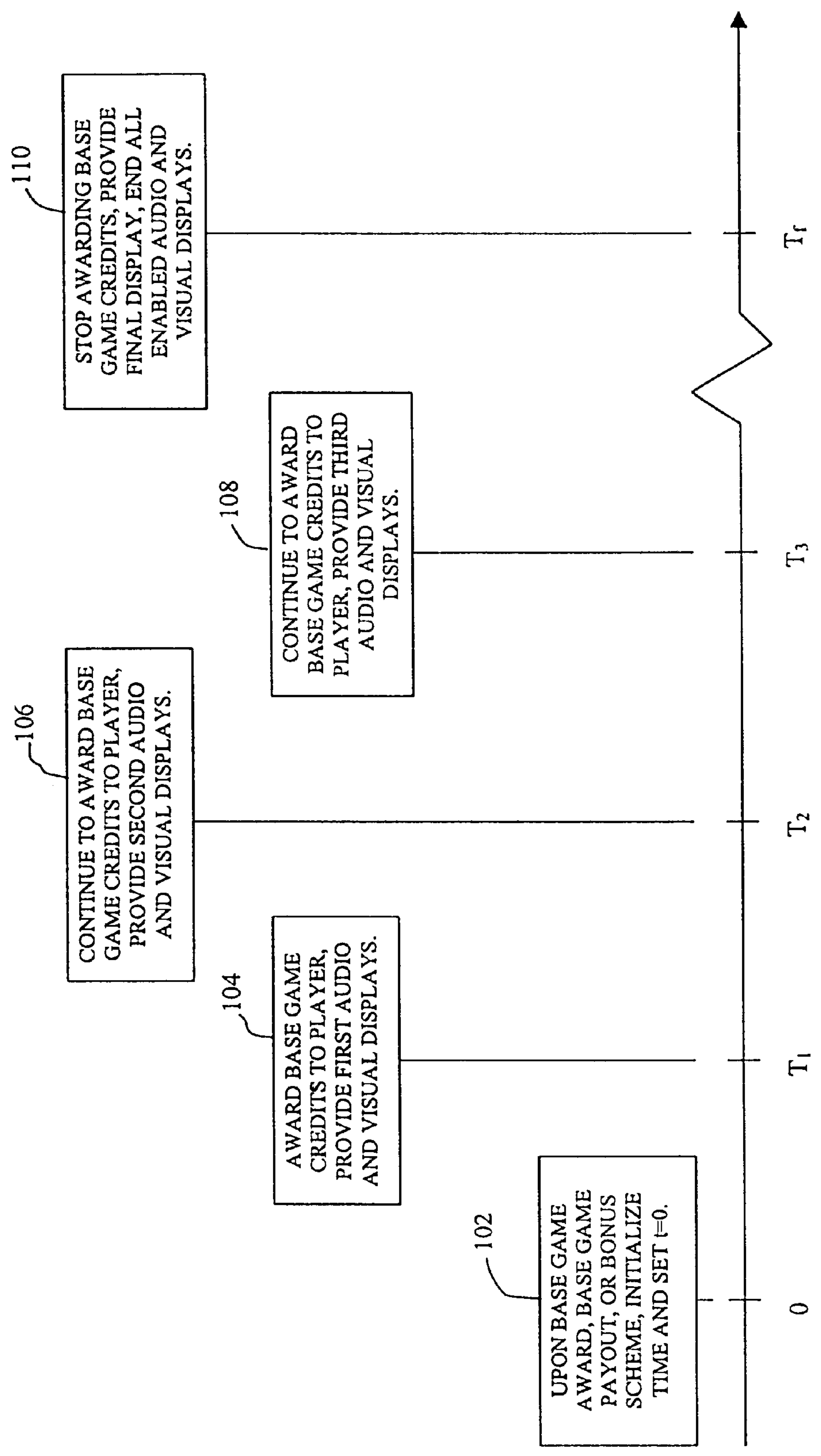
FIG. 3 is a schematic diagram of a time line generally illustrating the method of the present invention.

The method of the present enhances awards or transfers of awards and is hereinafter referred to as the award enhancement method. The award enhancement method generally controls the gaming device, which provides different audio and visual signals at different times during a payout or transfer of coins or tokens to a player. FIG. 3 illustrates a time line of the method of the present invention. As indicated by block 102, when the reels 30 stop and display a winning combination or single indicia yielding base game awards, when the player cashes out by selecting the cash out button 26, or when the player receives a bonus award (not illustrated), the gaming device 10 invokes the award enhancement method of the present invention. It should be appreciated that any one or any combination of the above awards or transfers could initiate the award enhancement method.

In one embodiment, the award enhancement method uses a timer or series of timers (not shown) that are initialized and reset by the processor 36 in accordance with a program stored in the memory device 38. The present invention contemplates using one timer having multiple set-points or multiple timers having one or a limited number of set-points. The timers can be separate devices that are hard-wired to the controller or are preferably internal timers contained within the processor 36. To more easily describe the award enhancement method, the method will be described according to the single timer embodiment.

As indicated by block 102, upon one of the award triggering events, the award enhancement method initializes the timer at time t=0, and the timer begins to run. As indicated by block 104, at time t=T1, the first set-point of the timer, the gaming device 10 begins to award or transfer base game credits to the player and to provide the first audio and/or visual displays to the player. The present invention contemplates providing a first visual display in the video monitor 32, a first audio display through the speakers 54, or preferably both. It should be appreciated that the present invention contemplates providing only a visual display or only an audio display. Preferably, T1 is a small period of time such as one second. Alternatively, T1 could be zero seconds, wherein the displays begin immediately upon an award triggering event or beginning of a transfer.

Preferably, the visual displays of the present invention relate to the audio displays. For example, if a visual display depicts a famous singer, the audio display could be the singer singing a song. The visual displays can be static screens having symbols or characters or be animated depictions such as a singer in concert. The audio displays can contain one signal or a plurality of signals. For example, the audio display could be only the singer's voice or the singer's voice with an accompanying sound from one or more musical instruments. However, it should be appreciated that the audio displays could contain the known ding or bell sound or other suitable sounds. When the displays are sounds such as a ding or bell, it is more likely that the present invention provides no accompanying visual display.

The gaming device provides only the first audio and first visual displays for the predetermined time between T1 and T2. Upon reaching the time T2, the second set-point of the timer, the gaming device 10 continues to pay or transfer the awards, continues to provide the first audio and visual displays and provides a second audio and second visual display as indicated by block 106. The second audio display preferably overlaps the first audio display and the second visual display overlaps the first visual display. Upon reaching the predetermined time T3,the third set-point of the timer, the gaming device 10 continues to pay or transfer the awards, continues to provide the first and second audio and visual displays and provides the third audio and third visual displays as indicated by block 108. The third audio display preferably overlaps the first and second audio display and the third video display overlaps the first and second visual displays. Ultimately, upon reaching the time Tf, the gaming device stops paying awards and preferably provides a final display that terminates all of the concurrent displays, which are active at time Tf as indicated by block 110.

The present invention contemplates selecting any number of different sets of audio and visual displays at any number of predetermined intermediate times. Preferably, the time Tf is not predetermined, rather, the time Tf is the time at which the gaming device 10 awards or transfers the final credit. Alternatively, the time Tf could be predetermined. For example, the memory device 38 could store a database of termination times Tf that correspond to a number of bonus awards. A final display is optional, but preferably an audio display such as a final note and a visual display such as the singer bowing to the audience terminates the displays. Alternatively, the displays could end all at once without the final display, or in an alternative embodiment as described later, cease at different times such as T2 and T3.

The present invention contemplates any lengths of time for the intermediate set-points, such as T2 and T3. Tf generally is the time necessary to award or transfer all the credits. Preferably, the intermediate set-points occur at different times in accordance with the audio and visual displays, the theme of the gaming device 10 or the bonus scheme. For example, if the total time necessary to award or transfer all the credits, Tf, is 30 seconds, the intermediate times T2 and T3 could be 10 seconds and 20 seconds.

Accumulation Embodiment

Figure 4:
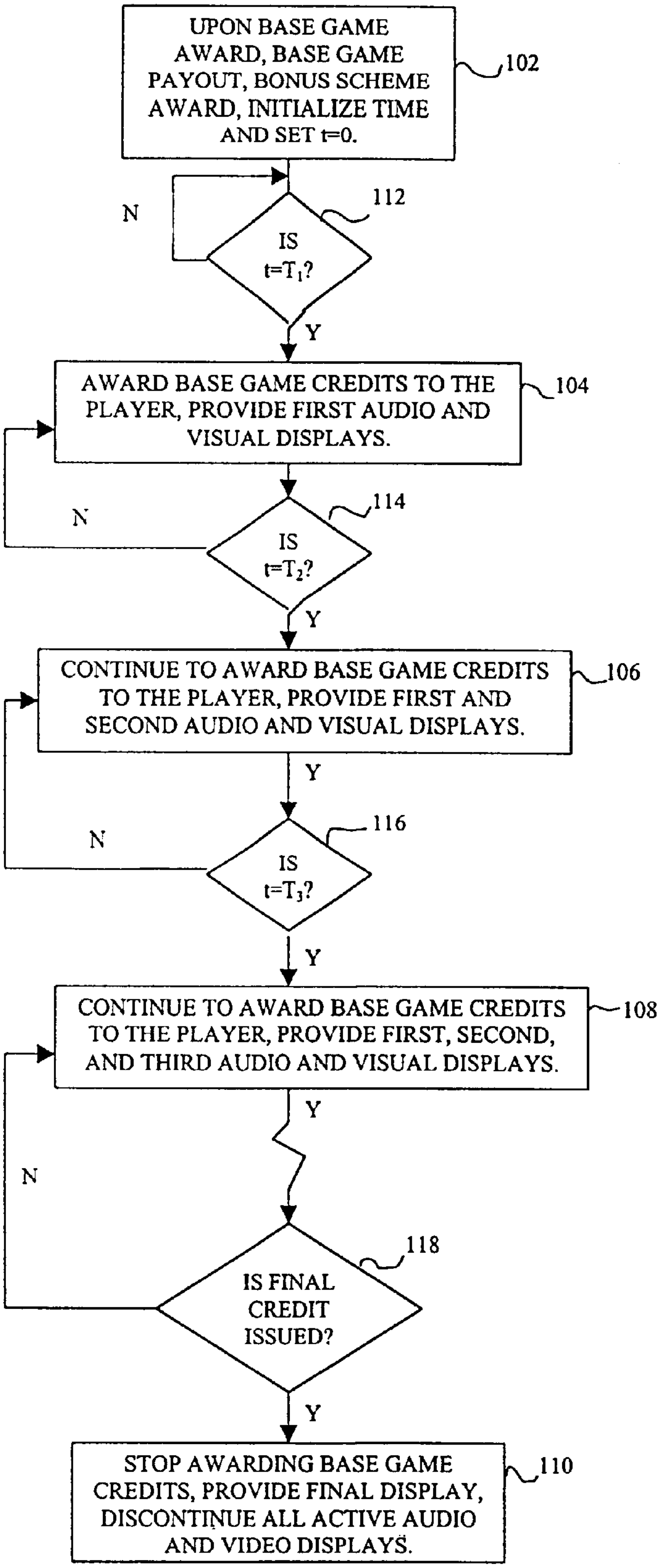
FIG. 4 is a block diagram illustrating the preferred embodiment of the present invention.

FIG. 4 illustrates the previously described blocks 102, 104, 106, 108 and 110 in connection with the preferred embodiment of the present invention, wherein the audio and visual displays overlap and form concurrent layers of sound and visual display. Adding consecutive display layers to currently playing sounds and displayed images increases player excitement and enjoyment by providing denser, richer and more complex sounds and visual images as the player accumulates larger amounts of credits or payouts. As indicated by block 102, when the reels 30 stop and show a winning combination or single indicia yielding base game awards, when the player cashes out by selecting the cash out button 26, or when the player receives a bonus award (not illustrated), the gaming device 10 invokes the award enhancement method, which initializes the timer at time t=0, and the timer beings to run.

As illustrated by diamond 112, when the time t=T1, the gaming device 10 begins to award or transfer base game credits to the player and to provide a first audio display and/or a visual display to the player as indicated by block 104. The preferred embodiment contemplates the gaming device providing a first visual display in the video monitor 32, and a first audio display through the speakers 54. Preferably, T1 is a small period of time such as one second, or alternatively, T1 could be zero seconds, wherein the displays begin immediately upon an award or transfer triggering event.

The preferred embodiment provides only the first audio and visual displays for the predetermined time between T1 and T2. Upon reaching the time T2 as determined in diamond 114, the gaming device 10 continues to pay or transfer awards and provides a second audio display and visual display as indicated by block 106, in addition to the first displays. Upon reaching the predetermined time T3 as determined in connection with diamond 116, the gaming device 10 continues to pay awards or make the transfer and provides a third audio display and visual display as indicated by block 108, in addition to the first and second displays. Ultimately, upon reaching the time Tf, the gaming device stops paying awards and preferably provides a final display that terminates any audio and visual displays still active at time Tf, as indicated by block 110. In the preferred embodiment, all of the displays are still active at time Tf. Preferably, Tf is not predetermined and occurs when the gaming device 10 issues or transfers the final credit.

The preferred embodiment of the present invention contemplates selecting any number of different sets of audio and visual displays at any number of predetermined intermediate times. After each set-point in time, both the visual and audio displays have more signals than before the set-point. For this reason, this embodiment is particularly adept as a simulation of an accumulation of base game credits, which increases player excitement and enjoyment.

In one example of the preferred embodiment, a player playing the gaming device 10 enters a bonus round. The player plays the bonus round and wins 500 credits. Upon finishing the bonus round, the gaming device invokes the award enhancement method of the present invention. The processor 36 sets an internal timer to zero seconds and starts the timer. Immediately thereafter, the gaming device begins to reduce the bonus round credits from the bonus round credit display and increase the player's base game credits, which accumulate in the player's credit display 16. At the same time, the gaming device displays a famous singer in the video monitor 32 and provides a first sound, which is a singer singing a song. The sound is emitted from the speakers 54, which are positioned in gaming device 10 to direct the sound towards the player. The video monitor 32 depicts a first visual display, which is an animated scene of the singer on stage.

The player accumulates the first 150 credits in 8 seconds, at which time the gaming device 10 displays a second visual and audio display, a piano and a piano player on stage with the singer in the video monitor and the piano's music along with the singer's voice. The player accumulates the first 300 credits in 16 seconds, at which time the gaming device 10 also displays a third visual and audio display, a guitar player with the singer and the piano player on stage and the guitar's music along with the singer's voice and the piano's music. The player accumulates all 500 credits in 24 seconds, at which time the gaming device 10 stops issuing credits, the video monitor 32 displays the players playing a final note, and the speakers provide a final sound from each of the three sources.

Selective Embodiment

Figure 5:
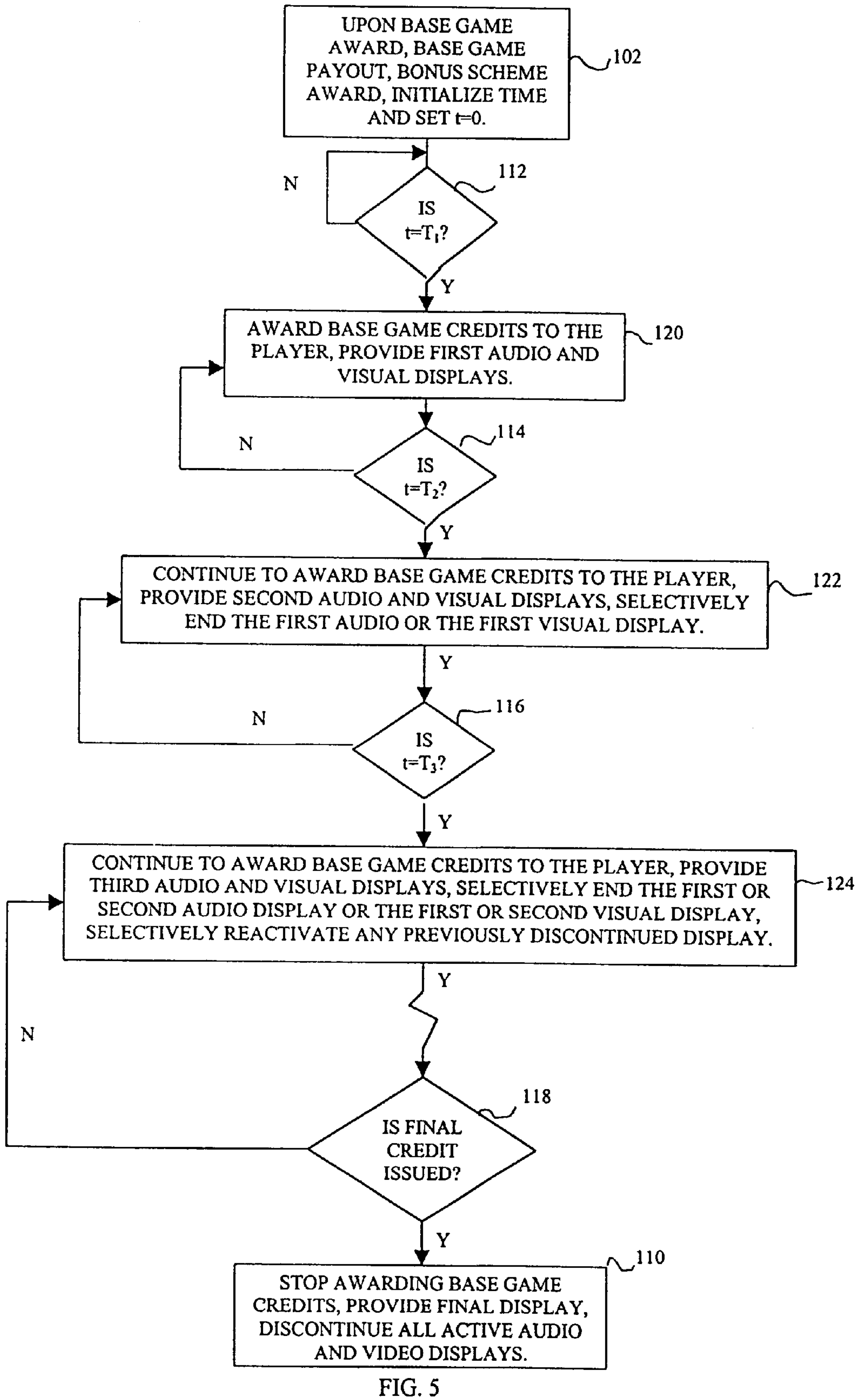
FIG. 5 is a block diagram illustrating an alternative embodiment of the present invention.

FIG. 5 illustrates the previously described blocks 102, 104, 106, 108 and 110 in connection with an alternative embodiment of the present invention, wherein the audio and visual displays are selectively overlapping or separate in accordance with the displays, the game or bonus themes. The game can discontinue any active visual or audio display at any intermediate set-point, such as T2 and T3. Furthermore, in this embodiment, the game can discontinue any component of any active visual or audio display if the display contains separable signals (e.g., the audio display containing singer's voice with an accompanying sound from a musical instruments).

As indicated by block 102, upon a credit transferring or awarding event, the timer begins to run. As determined by diamond 112, when the time t=T1, the gaming device 10 awards base game credits to the player and provides a first audio display and/or visual display as indicated by block 120. Upon reaching the time T2 as determined in diamond 114, the gaming device 10 provides a second audio and visual display. In this embodiment, the method may selectively discontinue either the first audio or visual displays or both as indicated by block 122. Upon reaching the predetermined time T3 as determined in connection with diamond 116, the gaming device 10 provides a third audio display and visual display as indicated by block 124. The method may selectively discontinue either the first or second audio displays, or any combination thereof, as indicated by block 124 along with the first and second displays. The method can selectively reactivate, at a later point in time, any discontinued audio or visual display from any prior point in time. In this embodiment, the implementor determines which displays are still active at time Tf in accordance with one or more of the gaming devices, bonus schemes or award method themes.

After each set-point in time, either the visual or audio display may have more or less signals than before the set-point. For this reason, this embodiment is particularly adept as a simulation of a current rate at which the gaming device 10 is issuing or transferring credits to the player, which increases player excitement and enjoyment. For example, the player could accumulate a first 250 credits in first 12 seconds (20.8 credits/second). Next, the gaming device 10 removes a visual and audio display (signaling a slow down of issuance), and the player accumulates a second 100 credits in the next 8 seconds (12.5 credits/second). Next, the gaming device 10 adds two more video and audio displays (signaling a speeding up of issuance), and then the player accumulates a remaining 150 credits in 4 seconds (37.5 credits/second).

Percentage Paid Based Embodiment

Previously, the award enhancement method and the alternative embodiments have been described in connection with a timer or set of timers, which alone or collectively contain a plurality of set-points in time that differentiate the content of the visual and audio displays. The present invention also contemplates differentiating the content of the visual displays based, not upon time, but upon a percentage of credits of the total payout that have been issued or transferred. In this embodiment, the a counter replaces the timer or timers as previously described.

The counter can be a separate device that is hard-wired to the controller or preferably an internal counter contained within the processor 36. The counter works in conjunction with the processor 36 and a database of set-point percentages stored in the memory device 38. As the counter counts, the processor 36 determines a percentage by dividing the number of counts by the total number of credits being issued or transferred. When the percentage counted, c%, matches a first set-point percentage, C1%, the award recognition method directs the gaming device to add or delete one or more audio or visual displays. The present invention contemplates using the counter embodiment, as described, in connection with the preferred and alternative embodiments above.

Figure 6:
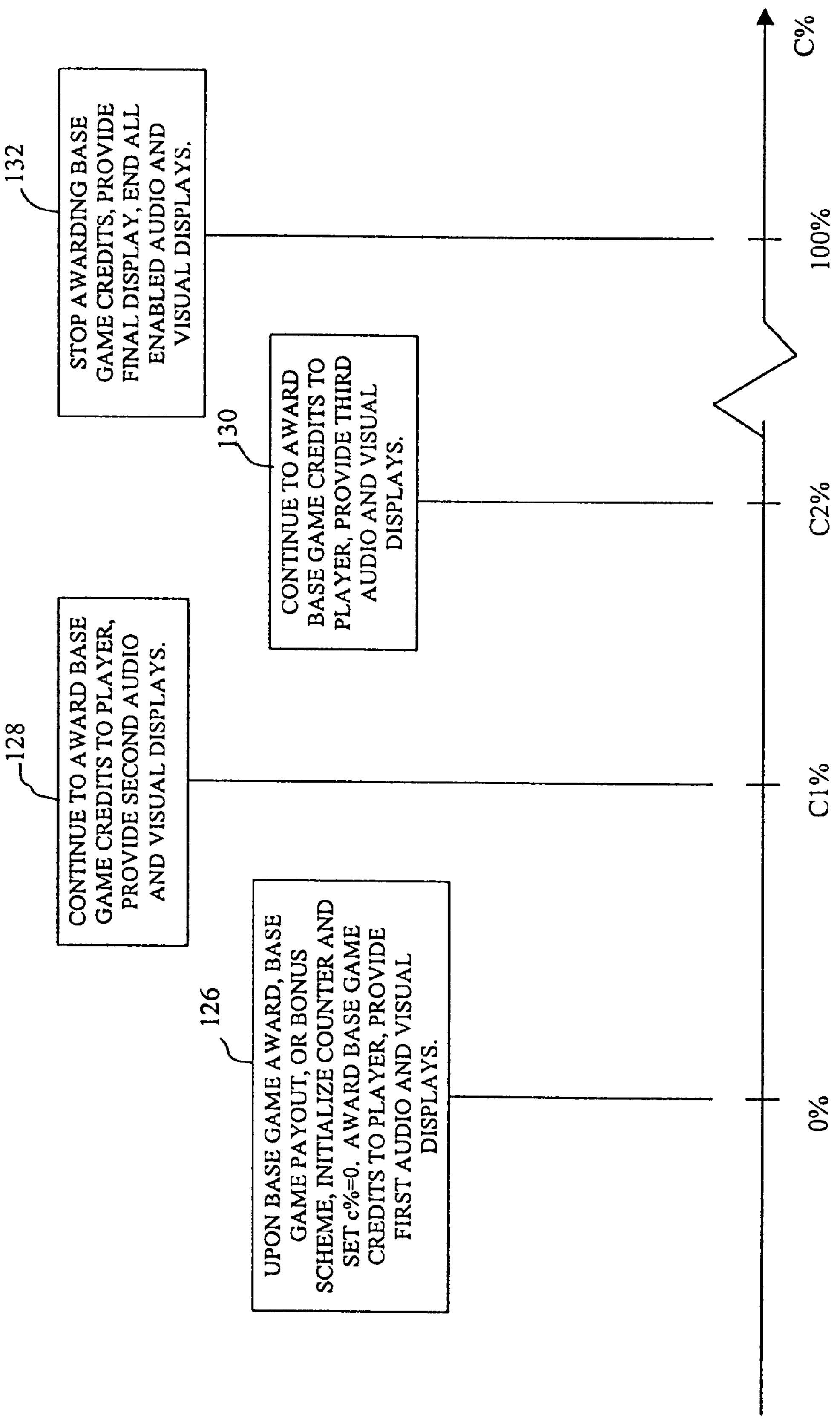
FIG. 6 is a schematic diagram based on a percentage of awards generally illustrating the method of the present invention.

FIG. 6 shows a percent line for the method of the present invention. As indicated by block 126, upon a credit transferring or awarding event, the gaming device 10 invokes the award enhancement method, which initializes the counter at c%=0, and the gaming device 10 begins to transfer or award base game credits to the player and to provide the first audio and/or visual displays to the player. Preferably, the visual and audio displays of the present embodiment are the same as described above. The gaming device 10 provides only the first audio and visual displays for the predetermined percentage between 0% and the first set-point C1% as indicated by block 128. Upon reaching the second set-point C2%, the gaming device 10 continues to pay awards and provides the second audio and visual displays as indicated by block 130. Ultimately, upon reaching 100%, the gaming device stops paying awards and preferably provides a final display that terminates any audio and visual displays active at the 100% point as indicated by block 132.

In an alternative embodiment of the counter embodiment, the set-points are based upon the number of credits counted rather than a percentage. In this embodiment, the gaming device adds or deletes displays or display components upon reaching a number of credits transferred and counted by the counter. For example, the gaming device could modify the displays at set points of 50, 100, 250 and 500 base game credit. If the total number of credits transferred is less than the maximum set point (i.e. 500 credits), the gaming device does not employ the 500 credit modification.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

What is claimed is:

1. A method for enhancing the transfer of an award, said method comprising the steps of:

(a) transferring a plurality of credits;

(b) sequentially producing a plurality of initial sounds during the transfer of the credits;

(c) concurrently sequentially producing a plurality of additional sounds during the transfer of the credits after a predetermined set-point while continuing to sequentially produce the plurality of initial sounds, the initial and additional sounds signaling a longer transfer than a credit transfer that occurs while only the initial sounds are produced; and (d) terminating the production of the initial and additional sounds at a time proximate to a completion of the transfer of credits.

2. The method of claim 1, wherein transferring a plurality of credits includes transferring a bonus award to a plurality of base game credits.

3. The method of claim 1, wherein transferring a plurality of credits includes transferring a plurality of base game credits to a plurality of coins or tokens.

4. The method of claim 1, wherein transferring a plurality of credits includes issuing a plurality of base game credits after winning a base game.

5. The method of claim 1, which further includes repeating step (c) for a plurality of set points.

6. The method of claim 1, which further includes displaying a visual display associated with the transfer of the credits.

7. The method of claim 6, which further includes concurrently displaying a plurality of additional visual displays after the predetermined set point.

8. The method of claim 7, which includes repeating the step of concurrently displaying a plurality of additional visual displays for a plurality of predetermined set points.

9. The method of claim 8, which includes terminating the displaying of the visual displays.

10. The method of claim 1, wherein the set-point occurs after a predetermined amount of time.

11. The method of claim 1, wherein the set-point occurs after a predetermined percentage of credits are transferred.

12. The method of claim 1, wherein the set-point occurs after a predetermined number of credits are transferred.

13. The method of claim 1, wherein the step of terminating the production of the sounds includes terminating the production of the sounds upon transferring a final credit.

14. The method of claim 1, wherein the step of terminating the production of the sounds includes terminating the production of the sounds after a predetermined period of time.

15. A method for enhancing the transfer of an award, said method comprising the steps of:

(a) transferring a plurality of credits;

(b) displaying an initial visual display during the transfer of the credits;

(c) concurrently displaying an additional visual display during the transfer of the credits after a predetermined set-point while continuing to display the initial visual display, the initial and additional visual displays signaling a longer credit transfer than a credit transfer that occurs while only the initial visual display is provided; and (d) terminating the displaying of the initial and additional visual displays at a time proximate to a completion of the transfer of credits.

16. The method of claim 15, wherein the visual displays are animated.

17. The method of claim 15, wherein the visual displays are static.

18. The method of claim 15, which further includes repeating step (c) for a plurality of set points.

19. The method of claim 15, which further includes producing a plurality of sounds associated with the transfer of the credits.

20. The method of claim 19, which further includes concurrently producing a plurality of additional sounds after the predetermined set point.

21. The method of claim 15, wherein the set-point occurs after a predetermined amount of time.

22. The method of claim 15, wherein the set-point occurs after a predetermined percentage of credits are transferred.

23. The method of claim 15, wherein the set-point occurs after a predetermined number of credits are transferred.

24. The method of claim 15, wherein the step of terminating the displaying of the visual displays includes terminating the displaying of the visual displays upon said transferring of a final credit.

25. The method of claim 15, wherein the step of terminating the displaying of the visual displays includes terminating the displaying of the visual displays after a predetermined period of time.

26. A gaming device comprising:

a processor;

a speaker connected to the processor; and a memory device for storing a program which is accessible by the processor, wherein the processor is operative with the program and the speaker to:

transfer a plurality of credits, sequentially produce a plurality of initial sounds during the transfer of said credits, concurrently sequentially produce a plurality of additional sounds after a predetermined set point during the transfer of said credits while continuing to sequentially produce the initial sounds, the initial and additional sounds signaling a longer credit transfer than a credit transfer that occurs while only the initial sounds are produced, and terminate the production of the initial and additional sounds at a time proximate to a completion of the transfer of credits.

27. The gaming device of claim 26, wherein the transfer of the plurality of credits includes the transfer of a bonus award to a plurality of base game credits.

28. The gaming device of claim 26, wherein the transfer of the plurality of credits includes the transfer of a plurality of base game credits to a plurality of coins or tokens.

29. The gaming device of claim 26, wherein the transfer of the plurality of credits includes issuing a plurality of base game credits after winning a base game.

30. The gaming device of claim 26, wherein the set-point is a predetermined amount of time during the transfer of credits.

31. The gaming device of claim 26, wherein the set-point is a predetermined percentage of credits transferred during the transfer of credits.

32. The gaming device of claim 26, wherein the set-point is a predetermined number of credits transferred during the transfer of credits.

33. A gaming device comprising:

a processor;

a video monitor connected to the processor; and a memory device for storing a program which is accessible by the processor, wherein the processor is operative with the program and the video monitor to:

transfer a plurality of credits, display an initial visual display during the transfer of credits, concurrently display an additional visual display after a predetermined set point during the transfer of said credits while continuing to display said initial visual display, the initial and additional visual displays signaling a longer credit transfer than a credit transfer that occurs while only the initial visual display is provided, and terminate the display of the initial and additional visual displays at a time proximate to a completion of the transfer of credits.

34. The gaming device of claim 33, wherein the transfer of the plurality of credits includes the transfer of a bonus award to a plurality of base game credits.

35. The gaming device of claim 33, wherein the transfer of the plurality of credits includes the transfer of a plurality of base game credits to a plurality of coins or tokens.

36. The gaming device of claim 33, wherein the transfer of the plurality of credits includes issuing a plurality of base game credits after winning a base game.

37. The gaming device of claim 33, wherein the set-point is a predetermined amount of time during the transfer of credits.

38. The gaming device of claim 33, wherein the set-point is a predetermined percentage of credits transferred during the transfer of credits.

39. The gaming device of claim 33, wherein the set-point is a predetermined number of credits transferred during the transfer of credits.

40. A gaming device comprising:

a processor;

a speaker connected to the processor;

a video monitor connected to the processor; and a memory device for storing a program which is accessible by the processor, wherein the processor is operative with the program, the speaker and the video monitor to:

transfer a plurality of credits, sequentially produce an initial plurality of sounds during the transfer of credits, display an initial visual display during the transfer of credits, concurrently sequentially produce a plurality of additional sounds after a first predetermined set point during the transfer of said credits while continuing to produce said initial sounds, concurrently display an additional visual display after a second predetermined set point during the transfer of said credits while continuing to produce said initial visual display, the initial and additional sounds and the initial and additional visual displays signaling a longer credit transfer than a credit transfer that occurs while only the initial sounds and visual display are provided, and terminate the production of the initial and additional sounds and the display of the initial and additional visual displays at a time proximate to a completion of the transfer of credits.

41. The gaming device of claim 40, wherein the first predetermined set point and the second predetermined set point are the same.

42. The gaming device of claim 40, wherein the first predetermined set point and the second predetermined set point are different.

43. The gaming device of claim 40, wherein the transfer of the plurality of credits includes the transfer of a bonus award to a plurality of base game credits.

44. The gaming device of claim 40, wherein the transfer of the plurality of credits includes the transfer of a plurality of base game credits to a plurality of coins or tokens.

45. The gaming device of claim 40, wherein the transfer of the plurality of credits includes issuing a plurality of base game credits after winning a base game.

46. The gaming device of claim 40, wherein at least one set-point is a predetermined amount of time during the transfer of credits.

47. The gaming device of claim 40, wherein at least one set-point is a predetermined percentage of credits transferred during the transfer of credits.

48. The gaming device of claim 40, wherein at least one set-point is a predetermined number of credits transferred during the transfer of credits.

49. A method for enhancing the transfer of an award in a gaming device having a base game operable upon a wager by a player, said method comprising:

(a) transferring a plurality of credits;

(b) sequentially and repeatingly producing at least one initial sound during the transfer of the credits;

(c) concurrently sequentially and repeating producing a plurality of additional sound during the transfer of the credits after a predetermined set-point while continuing to sequentially and repeatingly produce said at least one initial sound, the initial and additional sounds signaling a longer credit transfer than a credit transfer that occurs while only the initial sounds are produced; and (d) terminating the production of the initial and additional sounds at a time proximate to a completion of the transfer of credits.

50. The method of claim 49, wherein transferring a plurality of credits includes transferring a bonus award to a plurality of base game credits.

51. The method of claim 49, wherein transferring a plurality of credits includes transferring a plurality of base game credits to a plurality of coins or tokens.

52. The method of claim 49, wherein transferring a plurality of credits includes issuing a plurality of base game credits after a win in the base game.

53. The method of claim 49, which further includes repeating step (c) for a plurality of set points.

54. The method of claim 49, which further includes displaying a visual display associated with the transfer of the credits.

55. The method of claim 54, which further includes concurrently displaying a plurality of additional visual displays after the predetermined set point.

56. The method of claim 55, which includes repeating the step of concurrently displaying a plurality of additional visual displays for a plurality of predetermined set points.

57. The method of claim 56, which includes terminating the displaying of the visual displays.

58. The method of claim 49, wherein the set-point occurs after a predetermined amount of time.

59. The method of claim 49, wherein the set-point occurs after a predetermined percentage of credits are transferred.

60. The method of claim 49, wherein the set-point occurs after a predetermined number of credits are transferred.

61. The method of claim 49, wherein the step of terminating the production of the sounds includes terminating the production of the sounds upon transferring a final credit.

62. The method of claim 49, wherein the step of terminating the production of the sounds includes terminating the production of the sounds after a predetermined period of time.

63. A gaming device comprising:

a processor;

a speaker connected to the processor; and a memory device for storing a program which is accessible by the processor, wherein the processor is operative with the program and the speaker to:

transfer a plurality of credits, sequentially produce and repeat at least one initial sound during the transfer of said credits, concurrently sequentially produce and repeat-a plurality of additional different sounds after a predetermined set point during the transfer of said credits while continuing to sequentially produce and repeat said at least one initial sound, the initial and additional sounds signaling a longer credit transfer than a credit transfer that occurs while only the initial sounds are produced, and terminate the production of the initial and additional sounds at a time proximate to a completion of the transfer of credits.

64. The gaming device of claim 63, wherein the transfer of the plurality of credits includes the transfer of a bonus award to a plurality of base game credits.

65. The gaming device of claim 63, wherein the transfer of the plurality of credits includes the transfer of a plurality of base game credits to a plurality of coins or tokens.

66. The gaming device of claim 63, wherein the transfer of the plurality of credits includes issuing a plurality of base game credits after winning a base game.

67. The gaming device of claim 63, wherein the set-point is a predetermined amount of time during the transfer of credits.

68. The gaming device of claim 63, wherein the set-point is a predetermined percentage of credits transferred during the transfer of credits.

69. The gaming device of claim 63, wherein the set-point is a predetermined number of credits transferred during the transfer of credits.

70. A gaming device comprising:

a processor;

a speaker connected to the processor;

a video monitor connected to the processor; and a memory device for storing a program which is accessible by the processor, wherein the processor is operative with the program, the speaker and the video monitor to:

transfer a plurality of credits, sequentially produce and repeat at least one initial sound during the transfer of credits, display an initial visual display during the transfer of credits, concurrently sequentially produce and repeat a plurality of additional sounds after a first predetermined set point during the transfer of said credits while continuing to sequentially produce and repeat said at least one initial sound, concurrently display an additional visual display after a second predetermined set point during the transfer of said credits while continuing to display said initial visual display, the initial and additional sounds and the initial and additional visual displays signaling a longer credit transfer than a credit transfer that occurs while only any initial sounds and visual display are provided, and terminate the production of the initial and additional sounds and the display of the initial and additional visual displays at a time proximate to a completion of the transfer of credits.

71. The gaming device of claim 70, wherein the first predetermined set point and the second predetermined set point are the same.

72. The gaming device of claim 70, wherein the first predetermined set point and the second predetermined set point are different.

73. The gaming device of claim 70, wherein the transfer of the plurality of credits includes the transfer of a bonus award to a plurality of base game credits.

74. The gaming device of claim 70, wherein the transfer of the plurality of credits includes the transfer of a plurality of base game credits to a plurality of coins or tokens.

75. The gaming device of claim 70, wherein the transfer of the plurality of credits includes issuing a plurality of base game credits after winning a base game.

76. The gaming device of claim 70, wherein at least one set-point is a predetermined amount of time during the transfer of credits.

77. The gaming device of claim 70, wherein at least one set-point is a predetermined percentage of credits transferred during the transfer of credits.

78. The gaming device of claim 70, wherein at least one set-point is a predetermined number of credits transferred during the transfer of credits.

* * * * *

UNITED STATES PATENT AND TRADEMARK OFFICE

CERTIFICATE OF CORRECTION

PATENT NO. : 6,769,985 B1
APPLICATION NO. : 09/583985
DATED : August 3, 2004
INVENTOR(S) : Jeffrey P. Laakso et al.

It is certified that error appears in the above-identified patent and that said Letters Patent is hereby corrected as shown below:

In column 2, line 65, change "tokes" to --tokens--.

IN THE CLAIMS:

In Claim 1, column 10, line 56, change "a longer transfer" to --a longer credit transfer--.

Signed and Sealed this

Nineteenth Day of September, 2006

JON W. DUDAS
*Director of the United States Patent and Trademark Office*